Sept. 13, 1966 | N. D. NEWBY | 3,273,133

MAGNETIC CONTROL CIRCUIT

Filed Dec. 29, 1961 | 5 Sheets-Sheet 1

INVENTOR
N. D. NEWBY
BY William H. Kamstra
ATTORNEY

INVENTOR
N. D. NEWBY
BY William H. Kamstra
ATTORNEY

Sept. 13, 1966 N. D. NEWBY 3,273,133

MAGNETIC CONTROL CIRCUIT

Filed Dec. 29, 1961

5 Sheets-Sheet 3

INVENTOR
N. D. NEWBY
BY *William H. Kamstra*
ATTORNEY

INVENTOR
N. D. NEWBY
BY William H. Kamstra
ATTORNEY

INVENTOR
N. D. NEWBY
BY
William H. Kamstra
ATTORNEY

3,273,133
MAGNETIC CONTROL CIRCUIT

Neal D. Newby, Leonia, N.J., assignor to Bell Telephone Laboratories, Incorporated, New York, N.Y., a corporation of New York Filed Dec. 29, 1961, Ser. No. 163,338
16 Claims. (Cl. 340—174)

Figure 1A:
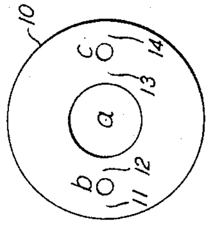

This invention relates to electrical circuits utilizing transfluxors and more particularly to such circuits in which a particular magnetic condition is sequentially generated in the transfluxors.

Electrical shift registers are well known in the information handling art. Information bits may be sequentially introduced at one end of such circuits in the form of current pulses and may then be shifted through successive stages of the register under the control of sequentially applied advance current pulses. At the output terminus of the register information bits may be made available to subsequent circuitry of the system of which the register comprises a part. Between each advance of information through the register, the information bits must be temporarily stored and, for this purpose, magnetic elements displaying substantially rectangular hysteresis characteristics have been found well suited. Shift registers employing conventional toroidal cores or multi-apertured cores, such as transfluxors, as information storage elements are well known and have found extensive application.

It is frequently necessary to introduce particular information bits into each stage of a shift register simultaneously and then to shift these information bits sequentially from the register to subsequent circuitry of the system. After these information bits have been shifted out of the register, particular other information bits may be introduced into the register and also shifted sequentially from the register to subsequent circuitry. This sequence may take place repeatedly with new information bits being inserted into the register immediately after the bits previously stored therein have been shifted out. In such a system it is necessary to know when a set of information bits has been completely shifted out of the register in order to introduce the next set of bits to the register at the proper time. A second shift register having the same number of stages as the first register may be used for this purpose. A particular binary value, say a binary 1, is inserted in the first stage of the second register simultaneously with the insertion of a set of bits in the first register. The remaining stages of the second register are in the cleared or binary 0 condition. The binary 1 is then shifted through the second register at the same rate that the bits are shifted through the first register. The reception of the binary 1 at the output terminus of the second register indicates that the set of bits previously introduced into the first register has been completely shifted out and that a new set of bits may be introduced into the first register along with another binary 1 into the first stage of the second register.

Although a second shift register circuit may be used for propagating a binary 1, as described above, it is not necessary that such a propagation circuit be a shift register. Since only a binary 1 is being shifted from one end of the circuit to the other, the circuit need not have the ability of storing and shifting a plurality of information bits comprising both binary 1's and binary 0's.

Accordingly, it is an object of this circuit to provide a new and improved bit propagation circuit.

It is another object of this invention to accomplish, without the use of intervening diodes, the propagation of an information bit through subsequent stages of a magnetic core circuit, each stage of which comprises only one core.

It is another object of this invention to provide a novel bit propagation circuit comprising transfluxors, connecting wires and signal sources only.

It is yet another object of this invention to accomplish the transfer of an information bit from one stage of a bit propagation circuit to a subsequent stage, without the use of intervening diodes, upon the application of only two current pulses.

Still another object of this invention is to accomplish a substantial reduction in circuit components in magnetic bit propagation circuits.

It is still a further object of this invention to accomplish the conversion of groups of information signals occurring in a timed sequence to corresponding groups of signals occurring simultaneously.

Yet another object of this invention is to accomplish the conversion of groups of information signals occurring simultaneously to corresponding groups of signals occurring in a timed sequence.

Still another object of this invention is to provide a magnetic bit propagation circuit in which only one magnetic element at a time produces an output as an information bit is propagated through succeeding stages of the circuit.

A still further object of this invention is to provide a magnetic bit propagation circuit capable of generating particular output signals as an information bit is propagated through the circuit.

The foregoing and other objects of this invention are realized in specific illustrative embodiments thereof utilizing a sequence of multiapertured magnetic cores as the basic stoarge elements. The cores may, for example, be of a well known transfluxor type having a central aperture and additional input and output apertures establishing four flux legs in each core. Initially a remanent magnetic flux condition representative of a binary 1 is established in the first core and remanent magnetic flux conditions representative of binary 0's are established in the remaining cores. Control current pulses applied in a two phase cycle of operation to windings coupled to the cores are effective to propagate sequentially a binary 1 through the entire sequence of cores.

The control current pulses are applied to the cores in alternating advance and prime phases. The prime pulses establish a "1-primed" magnetic flux condition in those cores in the 1 condition. A subsequent advance pulse returns the 1-primed cores to the 1 condition and establishes a 1 condition in cores previously in the 0 condition, which are adjacent to cores in the 1-primed condition. Cores in the 0 condition are switched to the 1 condition by currents induced in coupling loops connected between adjacent ones of the cores. No diodes or other unilateral conducting elements are utilized either in conductors to which the control pulses are applied or in the coupling loops between stages. Since each stage utilizes only one core, a one-core-per-bit circuit is realized.

As an alternative to the application of both the prime and advance signals on a pulsed basis to propagate a binary 1 through the cores, the priming signal may be applied on a direct current basis. The pulsed advance signals then overcome the effect of the priming signal during the advance phase of operation.

The foregoing illustrative propagation circuit may advantageously be adapted as a serial-to-parallel or parallel-to-serial translation circuit. For example, information in a parallel binary input code may be translated to serial dial pulse form. Utilizing ten cores, four conductors may be inductively coupled by windings of particular senses to particular ones of the cores such that the application of ten different combinations of signals to the conductors will set a different combination of cores to the binary 1 condition. Furthermore, for each of the ten combinations, a different one of the cores is the last one of the sequence of cores set to the binary 1 condition. A sequence of prime and advance signals is applied to the cores and the number of signals required to propagate the 1 condition to the last core of the sequence and to obtain an output signal from this core is counted. Thus, a combination of input signals representative of the decimal number 1 will set only the last core to the binary 1 condition and an output signal will be observed on an output winding of the last core during the initial application of the prime and advance signals. A comination of input signals representative of the decimal number 10 will set the first core to the binary 1 condition and an output signal will not be observed on the output winding until the tenth cycle of the prime and advance windings.

As an example of serial-to-parallel translation, information in serial dial pulse form may be translated to a parallel two-out-of-five output code. Again utilizing ten cores, dial pulse information, representative of the decimal numbers 1 through 10, is introduced into the cores with the number of cores driven to the binary 1 condition being equal to the number of dial pulses applied. Five output conductors are inductively coupled by windings of particular polarities to particular ones of the cores such that output signals of one polarity are induced in only two of these conductors upon the resetting to the binary 0 condition of the cores driven to the binary 1 condition by the dial pulses. Furthermore, output signals appear on a different pair of the output conductors for each of the ten possible numbers of dial pulses previously applied.

Magnetic elements having an additional output aperture may advantageously be utilized in this embodiment with the output windings linking the additional apertures. A separate priming winding also links these apertures and is used to prime the flux paths about the additional apertures prior to the resetting of the cores. The output windings may thereby be isolated from the other windings of the circuit during the input phase of operation.

The foregoing illustrative propagation circuit may also be advantageously adapted to perform a scanning operation. If each core of the sequence has an individual output winding threading its output aperture, then, as an information bit is propagated through the circuit, output signals will appear on a successively increasing number of the output windings. This results since signals appear on the output windings of those cores in the binary 1 condition and the number of cores in this condition increases each time the bit being propagated is transmitted to a succeeding stage. Unwanted output signals may advantageously be eliminated, however, by inductively coupling each output winding to its associated core in one sense and to the immediately succeeding core in the opposite sense. As a result, an output signal will appear only on that one output winding associated with a core in the binary 1 condition and adjacent to a core in the binary 0 condition and a scanning operation is thereby achieved.

A circuit capable of generating particular analog output signals may also be devised utilizing the foregoing illustrative propagation circuit. A counting circuit with a linear analog output may be realized by threading a single output conductor through the output apertures of each of the cores. Thus, as an information bit is propagated through the circuit an output signal is induced in the output conductor by every core in the binary 1 condition and the magnitude of the resultant signal induced in the output conductor is proportional to the number of cores in the binary 1 condition. Analog outputs with other than a linear relationship to the number of cores in the binary 1 condition such as, for example, an exponential relationship can be generated by variations in the polarity and number of turns by which the output conductor is coupled to the various cores.

Thus, according to one feature of this invention, a one-core-per-bit propagation circuit is provided which utilizes coupling loops advantageously having only their own inherent resistance and no diodes therein.

According to another feature of this invention a bit propagation circuit is provided having coupling loops utilizing no unilateral circuit elements and in which an information bit is shifted from one stage to the next by means of current pulses applied in a two phase cycle of operation.

According to yet another feature of this invention, a serial-to-parallel translation circuit is provided which includes a diodeless one-core-per-bit propagation circuit utilizing magnetic elements having two output apertures.

Figure 1B:
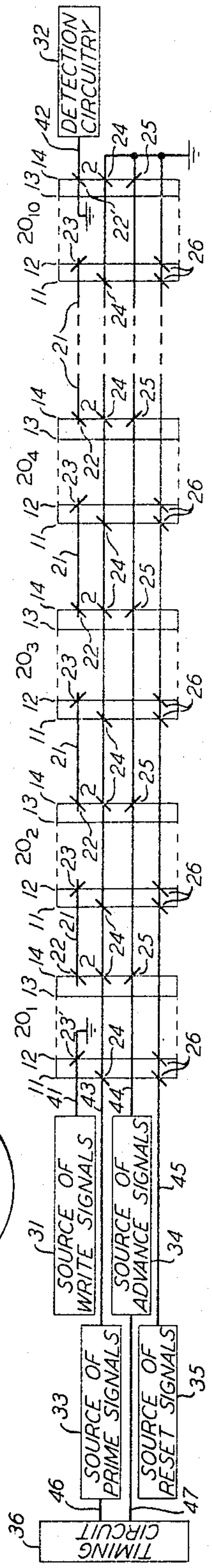
Figure 1C:
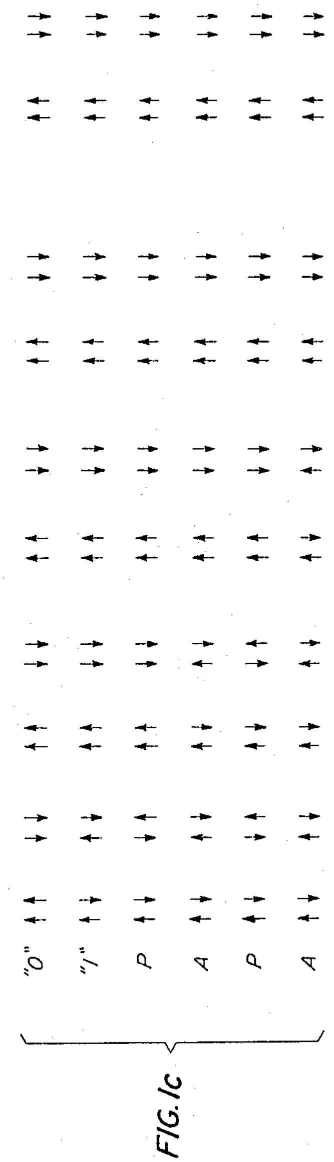
Figure 2A:
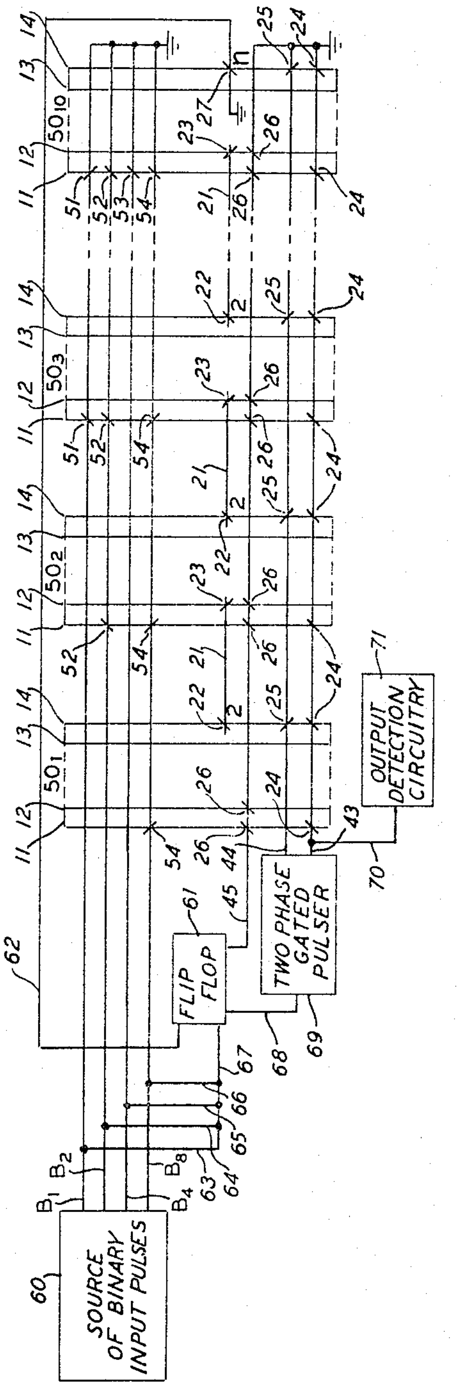
Figure 2B:
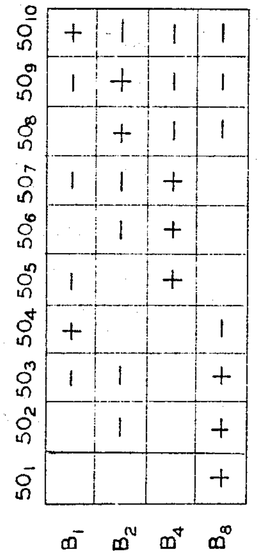
Figure 3A:
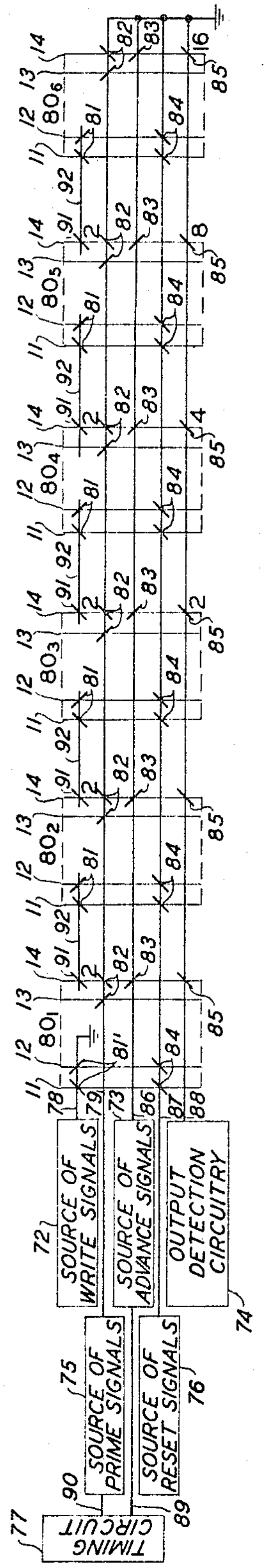
Figure 3B:
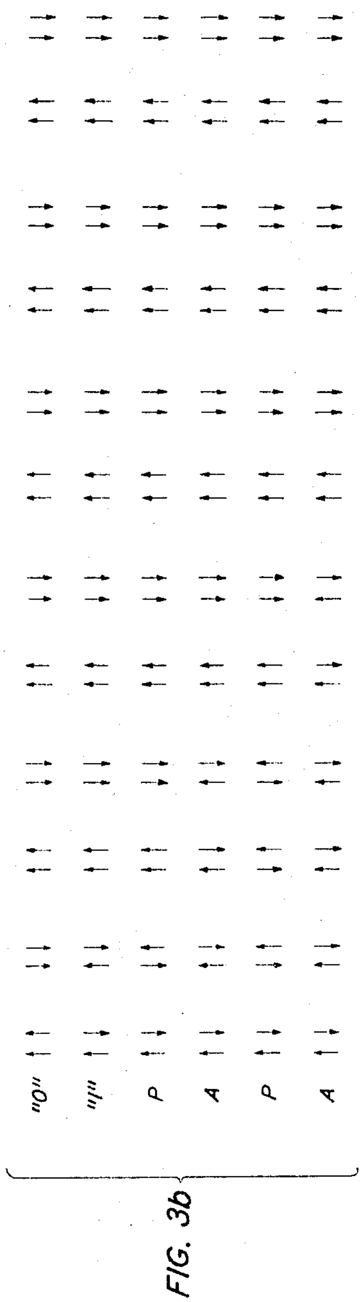
Figure 4:
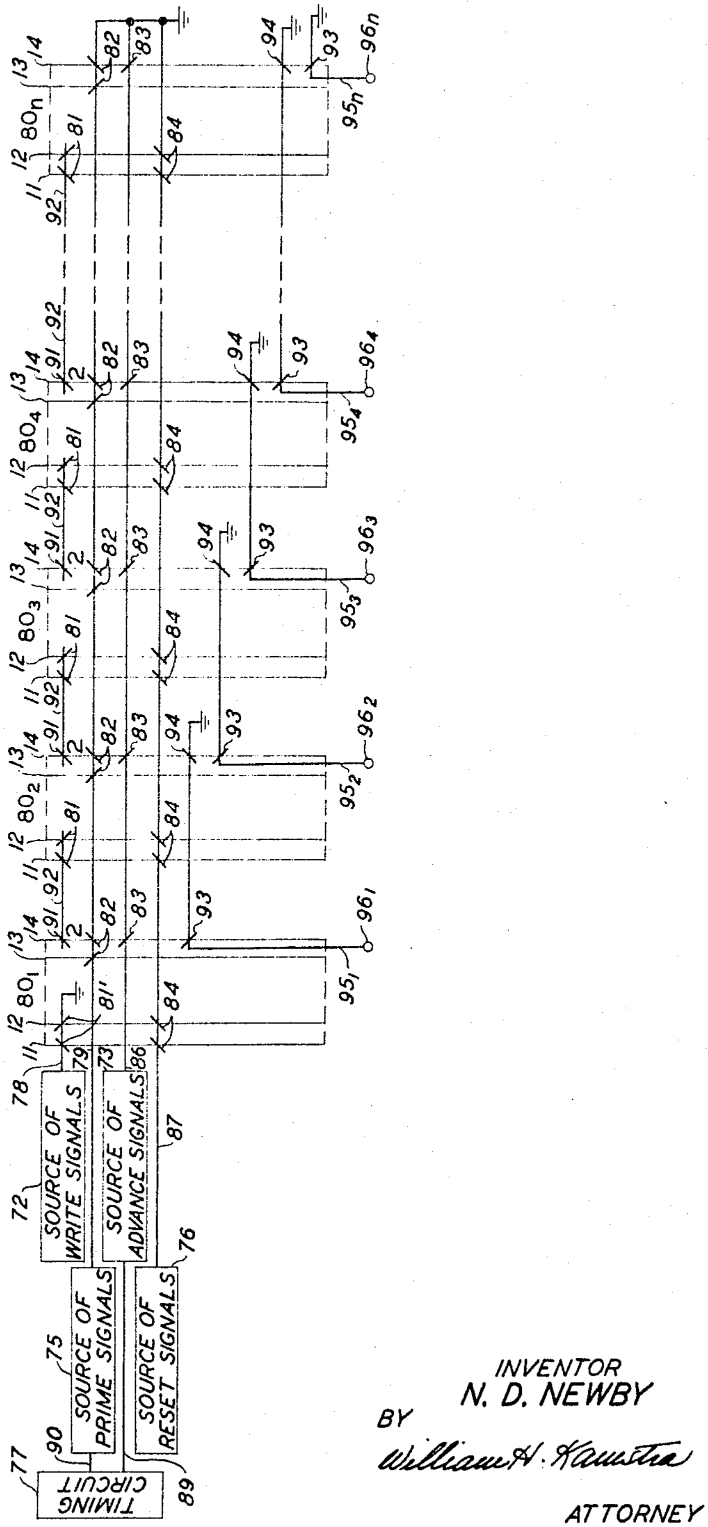
Figure 5B:
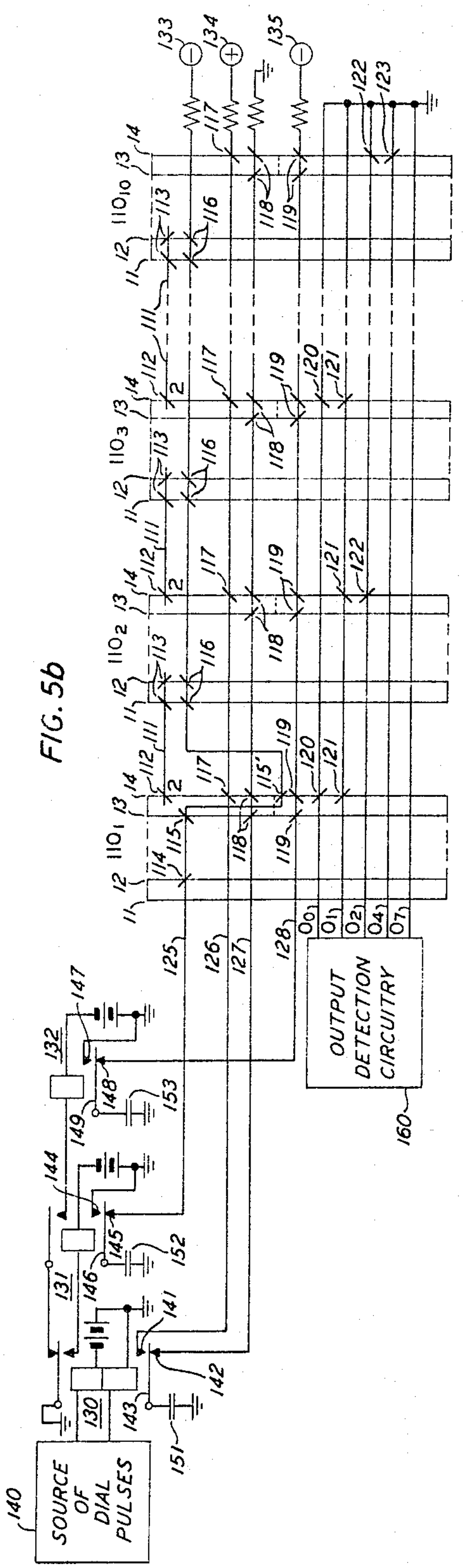
Figure 5C:
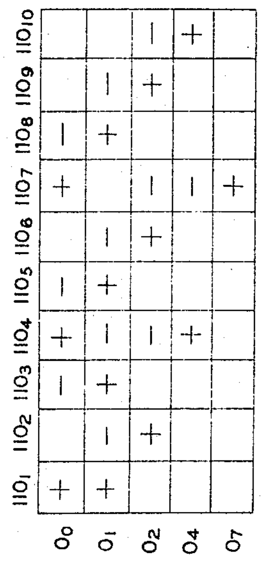
Figure 5A:
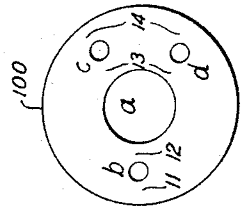

The foregoing and other objects and features of this invention will be more clearly understood by a consideration of the following detailed description when taken in conjunction with the following drawing in which:

FIG. 1*a* depicts a magnetic core which may advantageously be used in this invention;

FIG. 1*b* depicts, in conventional mirror symbol notation, a specific propagation circuit according to this invention;

FIG. 1*c* is a table showing various flux patterns at different operative stages of the circuit of FIG. 1*b*;

FIG. 2*a* depicts, in mirror symbol notation, a parallel-to-serial translation circuit according to this invention;

FIG. 2*b* is a table showing the polarity of windings inductively coupling input conductors and magnetic elements of the circuit of FIG. 2*a*;

FIG. 3*a* depicts, in mirror symbol notation, another circuit according to this invention which generates an analog output signal exponentially proportional to the count;

FIG. 3*b* is a table showing various flux patterns at different operative stages of the circuit of FIG. 3*a*;

FIG. 4 depicts, in mirror symbol form, a scanning circuit according to this invention;

FIG. 5*a* depicts another magnetic core which may advantageously be used in this invention;

FIG. 5*b* depicts, also in mirror symbol notation, a serial-to-parallel translation circuit according to this invention; and FIG. 5*c* is a table showing the polarity of windings inductively coupling output conductors and magnetic elements of the circuits of FIG. 5*b*.

FIG. 1*a* depicts a transfluxor 10 of a well known type having a central aperture *a*, an input aperture *b* and an output aperture *c* defining flux legs 11, 12, 13, and 14 therein.

FIG. 1*b* depicts a specific illustrative embodiment of a propagation circuit according to the principles of this invention. The conventional mirror symbol form of notation is employed which is described, for example, in an article by M. Karnaugh entitled "Pulse-Switching Circuits Using Magnetic Cores" appearing in the May 1955 Proceedings of I.R.E., and in an article by U. F. Gianola entitled "Integrated Magnetic Circuits for Synchronous Sequential Logic Machines," appearing in the March 1960 Bell System Technical Journal.

The circuit of FIG. 1*b* comprises a sequence of ten transfluxor cores $20_1$ through $20_{10}$, each of which is structurally similar to transfluxor 10 of FIG. 1*a*. Coupling loops 21 inductively couple adjacent ones of the transfluxors 20 by means of windings 22 and 23. Windings 22 couple each of the loops 21 to leg 14 of the lower ordered one of two adjacent transfluxors 20 by two turns as indicated in the drawing, and windings 23 couple each of the loops 21 to leg 12 of the higher ordered one of the adjacent transfluxors 20. Winding 23', coupled to leg 12 of transfluxor $20_1$, is connected between ground potential and a source of write signals 31 by conductor 41. Winding 22', coupled to leg 14 of transfluxor $20_{10}$, is connected between ground potential and detection circuitry 32 by conductor 42. Windings 24 are coupled to legs 11 and 14 of each of the transfluxors 20 and are connected between ground potential and a source of prime signals 33 by conductor 43. Windings 25, are coupled to leg 14 of each of the transfluxors 20, and are connected between ground potential and a source of advance signals 34 by conductor 44. Finally, windings 26 are coupled to the legs 11 and 12 of each of the transfluxors 20 and connected between ground potential and a source of reset signals 35 by conductor 45. The sense of the coupling between the cores 20 and each of the windings 22 through 26 is indicated in the drawing.

Each of the signal sources 31 and 33 through 35 is shown in block diagram form and may comprise any well known circuits capable of providing current signals of the character hereinafter described. Detection circuitry 32 is also shown in block diagram form and may comprise any well known circuitry capable of detecting signals generated in winding 22'. The source of prime signals 33 and source of advance signals 34 are connected to timing circuit 36 by conductors 46 and 47, respectively. The timing circuit 36 is also shown in block diagram form and may comprise any well known circuit capable of alternately energizing sources 33 and 34 according to a timed sequence.

Bearing in mind the foregoing organization, a description of an illustrative operation of the circuit of FIG. 1*b* will now be presented. The flux patterns shown in FIG. 1*c* will be utilized in connection with this description. Following the application of a positive reset signal from source 35, the flux patterns in the transfluxors 20 are as indicated in the first row of the table of FIG. 1*c*. This remanent condition in which the remanent flux is directed upward in legs 11 and 12 and downward in legs 13 and 14, as shown in FIG. 1*c*, will be designated to represent a binary 0.

A binary 1 is subsequently introduced into transfluxor $\mathbf{20_1}$ by the application of a positive write signal from source 31 which drives flux down in leg 12 and up in leg 13 of this transfluxor. The resulting remanent condition will be designated as representative of a binary 1 and is shown in the second row of FIG. 1*c* under transfluxor $\mathbf{20_1}$ of FIG. 1*b*.

A positive prime signal is next applied to conductor 43 and winding 24 from source 33. The priming signal merely drives the flux in legs 11 of cores $\mathbf{20_2}$ through $\mathbf{20_{10}}$ from its remanent condition to saturation in the same direction and is of insufficient magnitude to cause flux switching in the legs 14 of these cores. However, it causes a flux reversal in transfluxor $\mathbf{20_1}$ between legs 13 and 14 as shown in the third row of the table of FIG. 1*c*. The resulting flux pattern in transfluxor $\mathbf{20_1}$ will be designated as representative of a primed 1. The priming signal applied to winding 24 on leg 11 of transfluxor $\mathbf{20_1}$ prevents any flux reversal from taking place between legs 11 and 14 of this core. The flux reversal in leg 14 of transfluxor $\mathbf{20_1}$ cause a current to flow in coupling loop 21 between cores $\mathbf{20_1}$ and $\mathbf{20_2}$ of a polarity which merely tends to drive the flux in leg 12 of core $\mathbf{20_2}$ from its remanent condition to saturation in the same direction. Thus, the priming signal produces a flux change only in that core previously in the 1 condition driving that core to the 1-primed condition.

A positive advance signal is next applied to conductor 44 and windings 25 from source 34. This signal merely drives the flux in leg 14 of each of the cores $\mathbf{20_2}$ through $\mathbf{20_{10}}$ from its remanent condition to saturation in the same direction. However, it causes a flux reversal between legs 13 and 14 of core $\mathbf{20_1}$ reestablishing a binary 1 condition in this transfluxor. The flux reversal in leg 14 of core $\mathbf{20_1}$ causes a current to flow in coupling loop 21 between the cores $\mathbf{20_1}$ and $\mathbf{20_2}$ of a polarity to cause a flux reversal in legs 12 and 13 of core $\mathbf{20_2}$ thereby establishing the binary 1 condition in this transfluxor, as shown in the fourth row of FIG. 1*c*. Winding 22 is coupled to leg 14 of core $\mathbf{20_1}$ by two turns in order to make up for transfer losses and to insure that a complete flux reversal occurs between legs 12 and 13 of transfluxor $\mathbf{20_2}$ during the advance phase of operation. The advance signal applied to leg 14 of core $\mathbf{20_2}$ also prevents any flux reversal from occurring between legs 12 and 14 of this transfluxor.

Next a second prime signal is applied to conductor 43 and windings 24 from source 33. As discussed previously, the cores in the 0 condition, i.e. cores $\mathbf{20_3}$ through $\mathbf{20_{10}}$, are unaffected by the priming signal while the cores in the 1 condition, i.e. cores $\mathbf{20_1}$ and $\mathbf{20_2}$, are switched to the 1-primed condition.

A subsequent second advance signal applied to conductor 44 and windings 25 from source 34 serves to reestablish the binary 1 condition in cores $\mathbf{20_1}$ and $\mathbf{20_2}$ and to establish it in core $\mathbf{20_3}$.

The binary 1 condition may thus be advanced through the sequence of transfluxor cores 20 by the action of the priming and advance signals from source 33 and 34. Timing circuit 36 may control the energization of signals from source 33 and 34 in order to propagate a binary 1 according to a timed program.

When the binary 1 condition is established in the last transfluxor of the sequence, core $\mathbf{20_{10}}$, a signal induced in winding 22 during subsequent prime and advance phases of operation is transmitted via conductor 42 to detection circuitry 32. The appearance of this signal on winding 22' is indicative that a fixed number of pulses have occurred since core $\mathbf{20_1}$ was initially set to the binary 1 condition.

Thus, without the use of diodes between each stage and with only one transfluxor core in each stage, a novel bit propagation circuit is provided by the circuit of FIG. 1*b*. Furthermore, since only a two phase cycle of operation is utilized, faster propagation is possible than in previous diodeless propagation circuits utilizing a four phase cycle of operation. Greater economy and increased reliability is also provided by the reduction in circuit elements provided by this invention.

FIG. 2*a* depicts an illustrative parallel-to-serial translation circuit according to this invention. The translation circuit comprises a sequence of ten transfluxor cores, $\mathbf{50_1}$ through $\mathbf{50_{10}}$, each of which is structurally similar to transfluxor 10 of FIG 1*a*. Conductors having windings thereon inductively coupled to the cores $\mathbf{50_1}$ through $\mathbf{50_{10}}$ are coupled in the same manner as are the windings 22 through 26 of FIG. 1*b* and the same reference characters are therefore used in FIG. 2*a* to designate coupling loops 21, windings 22 through 26 and conductors 43 through 45. Windings 51, 52, 53, and 54 are inductively coupled to the leg 11 of particular ones of the cores 50 and are connected by conductors $B_1$, $B_2$, $B_4$, and $B_8$, respectively, between ground potential and a source of binary input pulses 60. Winding 27 is inductively coupled to leg 14 of core $\mathbf{50_{10}}$ and is connected between ground potential and a flip-flop circuit 61 by conductor 62. The sense of the coupling between each of the windings 51 through 54 and 27 and the cores 50 is as indicated in FIG. 2*a*. Conductors 63 through 66 connect the conductors $B_1$, $B_2$, $B_4$, and $B_8$, respectively, to the flip-flop circuit 61 via conductor 67. Conductor 68 connects an output terminal of the circuit 61 to a two phase gated pulser 69. A second output terminal of circuit 61 is connected to conductor 45. Two output terminals of pulser 69 are connected to conductors 43 and 44, respectively. Conductor 70 connects conductor 43 and output detection circuitry 71.

The source of binary input pulses 60 is shown in block diagram form and may comprise any well known circuit capable of producing input pulses of the character described hereinafter simultaneously on particular ones of the conductors $B_1$, $B_2$, $B_4$, and $B_8$ in accordance with a preselected code. Flip-flop circuit 61 is also shown in block diagram form and may comprise any well known bistable circuit capable of providing an output signal of the character described hereinafter on either one of two output terminals. The two phase gated pulser 69 is also shown in block diagram form and may comprise any well known circuit capable of providing two phase output signals of the character described hereinafter to separate terminals upon the application of a gating signal thereto. Similarly, output detection circuitry 71 is shown in block diagram form and may comprise any well known circuit capable of detecting and counting the output signals of one phase from pulser circuit 69.

FIG. 2*b* is a table showing the particular coupling arrangements between the windings 51 through 54 and the transfluxor cores $50_1$ through $50_{10}$. The arrangement of windings 51 through 54 on cores $50_4$ through $50_9$, not specifically shown, may be discerned from FIG. 2*b*, as described hereinafter.

Bearing in mind the foregoing organization, a description of an illustrative operation of the parallel-to-serial translation circuit of FIG. 2*a* will now be set forth. With all of the cores 50 initially in the binary 0 magnetic condition, the application of input signals simultaneously to particular ones of the conductors $B_1$, $B_2$, $B_4$ and $B_8$ serve to set particular ones of the cores 50 to a modified binary 1 magnetic condition by causing flux switching to occur between legs 11 and 13 of these cores. The windings 51 through 54 are coupled to leg 11 of the cores 50 rather than to leg 12, for the reason explained hereinafter, thereby causing particular ones of the cores to be driven to a modified 1 condition by signals from source 60 rather than to the binary 1 condition described previously.

The chart in FIG. 2*b* depicts the coupling arrangement between the windings 51 through 54 and leg 11 of the cores 50 in FIG. 2*a*. Thus, a + sign in the chart such as that in the conductor $B_1$ row and core $50_{10}$ column indicates that winding 51 on core $50_{10}$ is coupled to leg 11 of this core in a sense such that a positive signal on conductor $B_1$ tends to switch the flux in leg 11 downward. Conversely, a — sign in the chart such as that in the conductor $B_2$ row and core $50_3$ column indicates that winding 52 on core $50_2$ is coupled to leg 11 of this core in a sense such that a positive signal on conductor $B_2$ tends to hold the flux in leg 11 upward. The absence of a sign in the chart at the intersection of a particular row and column indicates that the conductor associated with the particular row and the core associated with the particular column are not inductively coupled.

Input signals are applied to the conductors $B_1$, $B_2$, $B_4$, and $B_8$ according to a binary code. Thus, a signal on conductor $B_1$ represents a 1, signals on both $B_1$ and $B_2$ represent a 3, signal on both $B_2$ and $B_4$ represent a 6, signals on $B_1$, $B_2$, and $B_4$ represent a 7. For each combination of signals representing the decimal numbers 1 through 10, a different one of the ten cores 50 is the last one of the sequence of cores driven to the modified 1 state. Following the application of input signals from source 60 alternating prime and advance signals are applied to the cores 50 from pulser 69 in a manner similar to that described in connection with the circuit of FIG. 1*b*. The last core of the sequence in the modified 1 condition is then utilized to propagate a binary 1 condition through successive ones of the cores under the control of the prime and advance signals. Upon the establishment of a 1 condition in core $50_{10}$ the following advance signal causes a flux reversal in leg 14 of core $50_{10}$ which induces a signal in winding 27 which signal causes flip-flop circuit 61 to assume its other stable condition thereby turning off pulser 69. Winding 27 is inductively coupled to leg 14 of core $50_{10}$ by *n* turns, *n* being a number of turns sufficient to produce a signal in conductor 62 adequate to switch circuit 61 to its other stable condition. The number of prime signals provided by pulser 69 prior to its being turned off is counted by detection circuitry 71 and this serial count is indicative of the particular information value previously applied to conductors $B_1$, $B_2$, $B_4$, and $B_8$ in parallel form.

Thus, for example, a signal applied to only conductor $B_1$ switches flux down in leg 11 and up in leg 13 of core $50_{10}$ thereby setting this core to the modified 1 condition. The signal applied to conductor $B_1$ is also applied to flip-flop circuit 61 via conductors 63 and 67 thereby setting circuit 61 to its stable condition in which a positive signal is applied to conductor 68. The signal on conductor 68 serves to gate pulser 69 which commences to apply prime and advance signals to conductors 43 and 44, respectively. The first prime signal causes flux reversal to occur between legs 13 and 14 of core $50_{10}$. The following signal causes another flux reversal to occur between legs 13 and 14 of core $50_{10}$ and induces a signal in winding 27 of a polarity to switch flip-flop circuit 61 back to its initial condition whereby pulser 69 is turned off and a positive signal is applied to conductor 45 which resets all of the cores 50. Only one prime signal from source 69 was detected by detection circuitry 71 thereby indicating that signals indicative of a 1 were transmitted from source 60.

As another illustrative example, signals applied simultaneously to conductor $B_2$ and $B_8$ will set only core $50_1$ to a modified 1 condition. The chart in FIG. 2*b* shows that coupling in a — sense between the cores 50 and windings 52 and 54 prevents all of the cores $50_2$ through $50_{10}$ from being driven to the modified 1 condition. The signal induced in winding 54 on cores $50_1$, however, drives this core to the last mentioned condition. Subsequent prime and advance signals propagate a binary 1 condition into core $50_2$ and then to the remainder of the cores 50 as previously described in connection with the circuit of FIG. 1*b*. The windings 52 through 54 are on leg 11 of the cores 50 to isolate these windings from the windings 23 thereby to prevent signals from being induced in these windings during propagation down the chain of cores 50. With core $50_1$ the only core initially in the modified 1 condition, ten prime signals will be counted by detection circuitry 71 before pulser 69 is turned off, thereby indicating that signals representing the number 10 were transmitted from source 60.

FIG. 3*a* depicts another illustrative circuit according to this invention which is designed to generate an analog pulse signal exponentially proportional to the number of cores in the binary 1 condition. This circuit is organized and operates in a manner similar to the circuit of FIG. 1*b*. It comprises a sequence of transfluxor cores $80_1$ through $80_6$ each of which is structurally similar to transfluxor 10 of FIG. 1*a*. Windings 81 through 85, 91 and 81' are inductively coupled to particular ones of the cores 80 as shown in the drawing. The winding 81', 82, 83, 84, and 85 are connected by conductors 78, 79, 86, 87, and 88, respectively, between ground potential and a source of write signals 72, a source of prime signals 75, a source of advance signals 73, a source of reset signals 76, and output detection circuitry 74, respectively. Windings 91 and 81 of adjacent ones of the cores are connected by coupling loops 92. The source of prime signals 75 and the source of advance signals 73 are connected by conductors 90 and 89, respectively, to timing circuit 77.

The sources 72, 73, 75 and 76 and timing circuit 77 are shown in block diagram form and may comprise any well known circuits capable of performing the functions described in connection with the corresponding sources of the circuit of FIG. 1*b*. Output detection circuitry 74 is also shown in block diagram form and may comprise any well known circuitry capable of detecting the presence and magnitude of voltage signals appearing on conductor 88.

The main structural differences between the circuit of FIG. 3 and that of FIG. 1*b* reside in the placement of input windings 81 on both legs 11 and 12, prime windings 82 on both legs 13 and 14 and the use of output windings 85 on leg 14 of the cores 80 in FIG. 3. The windings 85 are coupled to cores $80_1$ and $80_2$ by a single turn, to core $80_3$ by two turns, to core $80_4$ by four turns, to core $80_5$ by eight turns and to core $80_6$ by sixteen turns.

Bearing in mind the foregoing organization, an illustrative operation of this circuit will now be described. Following the application of a positive reset signal from source 76 all of the cores 80 are in the binary 0 condition as indicated in the first row of the table of FIG. 3*b*. A binary 1 is subsequently introduced into core $80_1$ by the application of a positive signal from source 72. Prime and advance signals are next applied sequentially to conductors 79 and 86, respectively, from sources 75 and 73, respectively, under the control of timing circuit 77 in the manner described in connection with the discussion of the circuit of FIG. 1*b*. The first prime signal sets core $80_1$ to the 1-primed condition and the first advance signal resets core $80_1$ to the 1 condition and sets core $80_2$ to the 1 condition as shown in the third and fourth rows of the table of FIG. 3*a*. Thus far the operation of the circuit of FIG. 3*a* has been virtually identical to that of the circuit of FIG. 1*b* previously described.

However, the application of the second prime signal to conductor 79 from source 75 not only derives core $80_1$ to the 1-primed condition previously describer, but also drives core $80_2$ to a 1-primed condition in which flux reversal has occurred both between legs 13 and 14 and also between legs 11 and 12 of core $80_2$, as shown in the fifth row of the table of FIG. 3*b*. This results because of the windings 81 on both legs 11 and 12 of core $80_2$. The prime signal effects flux switching about the flux path comprising legs 13 and 14 of core $80_1$ thereby inducing a signal in winding 91 of core $80_1$ and causing a current to flow in coupling loop 92. Because of the windings 81 on both legs 11 and 12 of core $80_2$ the current in loop 92 creates a magnetomotive force sufficient to cause flux switching in these legs during the prime phase of operation when this core is in the 1 condition. The prime signal and the signal appearing in any of the loops 92 during the prime phase of operation are insufficient to cause appreciable switching between legs 14 and 11 of any core in the 0 condition. Hence, as the binary 1 condition is propagated along the sequence of cores 80, these cores, other than core $80_1$, which have already been set to the 1 condition; are switched between the 1 condition and a 1-primed condition in which switching occurs both between legs 11 and 12 and between legs 13 and 14. This is shown for core $80_2$ in the fifth and sixth rows of the table of FIG. 3*b*.

The result of the switching between the 1 condition and the above described 1-primed condition is that approximately uniform output signals are generated during the advance phase of operation in the output winding 85 of core $80_1$ and of any of the cores 80 switching between these two conditions. Thus, for example, an output signal of a particular magnitude is generated in winding 85 of core $80_1$ when a binary 1 is being transmitted from core $80_1$ to core $80_2$ during an advance phase of operation. Because of the back electromotive force generated in winding 12 of core $80_2$ during this phase of operation, the flux switching in leg 14 of core $80_1$ is not appreciably slowed by the current flowing in the loop 92 between cores $80_1$ and $80_2$. If a flux reversal between legs 11 and 12 of core $80_2$ did not occur during the succeeding prime phase of operation, a much larger current would flow in the loop 92 during the following advance phase of operation, switching in leg of core $80_1$ would be slowed and an output signal of substantially diminished amplitude would be induced in winding 85 of core $80_1$.

The above described means by which uniform output signals are induced in the output winding 85 of each of cores 80 during the advance phase of operation both during and subsequent to the initial transfer of a binary 1 from a particular core is utilized in FIG. 3*a* to achieve a particular output on conductor 88. Thus, after core $80_1$ has been set to the 1 condition, an output signal of a particular magnitude is generated in winding 85 of $80_1$ and detected by detection circuitry 74. An output signal of twice this unitary magnitude is detected by circuitry 74 during the next advance phase due to signals of unitary magnitude induced in windings 85 of cores $80_1$ and $80_2$. An output signal of four times this unitary magnitude is detected during the next advance phase due to unitary magnitude signals induced in windings 85 of cores $80_1$ and $80_2$ and a signal of twice the unitary magnitude induced in the winding 85 coupled to core $80_3$ by two turns. An output signal of eight times the unitary magnitude is detected during the next advance phase followed by output signals of sixteen and thirty-two times the unitary magnitude during the next succeeding advance phases. Thus, an output which increases in magnitude exponentially during the propagation of a bit through a sequence of cores is realized by the circuit of FIG. 3*a*.

Other desired output signals could also be generated by circuits similar to that of FIG. 3*a* by merely adjusting the number of turns and the sense of the windings 85 coupled to the cores 80. Thus, for example, by coupling a winding 85 to each core 80 by a single turn, the output signal detected by circuitry 74 increases in magnitude by one unit with each succeeding advance signal and a counting circuit having an analog output is thereby realized.

FIG. 4 depicts another illustrative circuit according to this invention which may be utilized to perform a scanning function. The circuit of FIG. 4, and that of FIG. 3*a*, are structurally very similar and operate in a similar manner. The same reference characters are therefore utilized to identify the same elements of those circuits. In FIG. 4, however, a sequence on *n* cores 80 is utilized and detection circuitry 74, conductor 88 and windings 85 of FIG. 3*a* have been replaced by conductors $95_1$ through $95_n$, windings 93 and windings 94.

The conductors $95_1$ through $95_n$ are inductively coupled in one sense to leg 14 of cores $80_1$ through $80_n$, respectively, by windings 93. The conductors $95_1$ through $95_{n-1}$ are also inductively coupled in the opposite sense to leg 14 of cores $80_2$ through $80_n$, respectively, by windings 94. The conductors $95_1$ through $95_n$ terminate in a source of ground potential and output terminals $96_1$ through $96_n$ respectively.

In operation, the circuit of FIG. 4 produces an output signal only on a particular one of the output terminals 96 during each advance phase of operation. This results since a signal of one polarity is induced during the advance phase in each winding 93 coupled to a core 80 set to the 1-primed condition by the preceding prime signal while a signal of the opposite polarity is induced at this time in each winding 94 also coupled to a core 80 in the 1-primed condition. These two signals cancel one another except in that one conductor 96 having a winding 93 coupled to a core 80 in the 1-primed condition and a winding 94 coupled to a core 80 in the 0 condition. Thus, as a bit is propagated through the sequence of cores 80, the appearance of a signal output signal is propagated along the sequence of terminals 96 and a scanning function is achieved.

FIG. 5*a* depicts a transfluxor 100 similar to the transfluxor 10 of FIG. 1*a* except that transfluxor 100 has an additional output aperture *d*. The additional output aperture allows a transfluxor of this type which has been set to the 1 condition to then have prime and advance signals applied separately to the flux paths about the two output apertures. By this means an information bit can be propagated along a sequence of cores utilizing prime and advance windings coupled to one output aperture of each core while maintaining other windings coupled to the other output aperture of each core magnetically isolated from the first mentioned windings during propagation of the information bit through the sequence of cores.

FIG. 5*b* depicts an illustrative serial-to-parallel translation circuit according to this invention which utilizes a sequence of transfluxor cores $110_1$ through $110_{10}$ structurally similar to the core 100 of FIG. 5*a*. The flux path about aperture *c* of each of the cores 110 is indicated by the upper portions of legs 13 and 14 and the flux path about aperture *d* of each of the cores 110 is indicated by the lower portions of legs 13 and 14, the two portions of these legs of the cores 110 being shown as separated by a dotted line in FIG. 5*b*.

Coupling loops 111 are inductively coupled to legs 11, 12 and that part of leg 14 about aperture *c* of adjacent ones of the cores 110 by windings 112 and 113. Conductor 125 is coupled to leg 12 of core $110_1$ by winding 114, to that part of leg 13 of core $110_1$ about aperture *c* by winding 115, to that part of leg 14 of core $110_1$ about aperture *d* by winding 115', and to legs 11 and 12 of cores $10_2$ through $110_{10}$ by windings 116 and is connected between a negative voltage source 133 and break contact 145 of relay 131. Conductor 126 is coupled to that part of leg 14 of each of the cores 110 about aperture *c* by windings 117 and is connected between a positive voltage source 134 and make contact 141 of relay 130. Conductor 127 is coupled to those parts of legs 13 and 14 of each of the cores 110 about aperture *c* by windings 118 and is connected between ground potential and break contact 142 of relay 130. Conductor 128 is coupled to those parts of legs 14 of each of the cores 110 about aperture *d* by windings 119 and is connected between a negative voltage source 135 and break contact 148 of relay 132.

Conductors $0_0$, $0_1$, $0_2$, $0_4$, and $0_7$ are coupled to that portion of leg 14 of the cores 110 about aperture *d* by windings 120, 121, 122, 123, and 124, respectively, and are connected between ground potential and output detection circuitry 160. The particular coupling arrangements between the windings 121 through 124 and the transfluxor cores 110 are shown in the table of FIG. 5*c* in a manner similar to that previously discussed in connection with the table of FIG. 2*b*. Winding 124 coupling conductor $0_7$ to core $110_7$ is indicated in the table of FIG. 5*c* but is not shown in FIG. 5*b*.

Relays 130, 131, and 132 and their associated circuitry are identical to the circuit shown on page 421 of The Design of Switching Circuits by Keister, Ritchie and Washburn, D. Van Nostrand Company, 1951, and need not be fully described here. Suffice it to say that upon the application of sequential dial pulses from a source 140, relay 130 operates and releases during each applied pulse, while relays 131 and 132 operate during the first dial pulse but release only after the dial pulse sequence has terminated, relay 132 releasing prior to relay 131. Springs 143, 146, and 149 and their associated contacts 141 and 142, 144 and 145, and 147 and 148, respectively, associated with the relays 130, 131, and 132, respectively, have been added to the circuit shown in the above cited text. The springs 143, 146, and 149 are connected to ground potential via capacitors 151, 152, and 153, respectively.

Output detection circuitry 160 is shown in block diagram form and may comprise any well known circuit capable of detecting output signals on a particular two of the five output conductors $0_0$, $0_1$, $0_2$, $0_4$, and $0_7$. Source 140 is also shown in block diagram form and may comprise any well known circuit capable of producing current pulses in a timed sequence.

Bearing in mind the foregoing organization, an illustrated operation of the circuit of FIG. 5*b* will now be described. Upon the application of a sequence of pulses from source 140, relay 130 energizes and releases with each pulse and spring 143 completes a circuit through contact 141 and then releases to complete a circuit through contact 142 for each pulse. Accordingly, during each pulse an advance signal flows from voltage source 134 through conductor 126 and spring 143 to ground thereby charging capacitor 151. Also during each pulse a priming signal flows through conductor 127 to ground upon the discharge of capacitor 151 through spring 143, contact 142, and conductor 127. During the priming and advance phases of operation the contacts 141 and 142 need not be prevented from chattering since successive prime or advance signals produced by such chattering will not affect propagation.

Relays 131 and 132 are also energized upon the initial application of a sequence of pulses from source 140 and remain energized until the sequence terminates. During this time capacitors 152 and 153 discharge through spring 146 and contact 144, and spring 149 and contact 147, respectively, to ground potential. Upon the release of relay 132, a second priming signal flows from source 135 through conductor 128, contact 148, spring 149 and capacitor 153 to ground. Upon the subsequent release of relay 131, a reset signal flows between ground potential, capacitor 152, spring 146, transfer contact 145 and conductor 125 to negative potential source 133. During the application of this reset signal, output signals induced in particular ones of the windings 121 through 124 appear on a particular two of the conductors $0_0$, $0_1$, $0_2$, $0_4$, and $0_7$ indicative of the number of sequential pulses applied from source 140 and these signals are detected by circuitry 160.

After the application of a previous reset signal to conductor 125, core $110_1$ is in the binary 1 condition and the remaining cores 110 are in the binary 0 condition. If, for example, three sequential pulses are transmitted from source 140, three advance signals and three prime signals will be applied to conductors 126 and 127, respectively. The initial advance signal has no effect since core $110_1$ is in the 1 state rather than the 1-primed state. The following prime signal reverses flux in the path about aperture *c* of core $110_1$. The following advance and prime signals advance the binary 1 condition to cores $110_2$ and $110_3$ in a manner similar to that described in connection with the circuit of FIG. 3*a*. Upon the termination of the pulses transmitted by source 140 a priming signal on conductor 128 reverses flux in the path about aperture *d* of cores $110_1$, $110_2$, and $110_3$, but has no effect on cores $110_4$ through $110_{10}$ since these cores remain in the binary 0 condition. A subsequent reset signal on conductor 125 drives cores $110_2$ and $110_3$ to the 0 condition and drives core $110_1$ to the 1 condition. The reset signal causes flux reversal about the aperture *d* of each of the cores $110_1$, $110_2$, and $110_3$ thereby inducing signals in the windings 120 and 121 of core $110_1$, the windings 121 and 122 of core $110_2$ and the windings 120 and 121 of core $110_3$. The signals induced in the windings 120 cancel each other and the signals induced in two of the three windings 121 cancel each other. Thus, the induced signals appear on only conductors $0_1$ and $0_2$ of the five output conductors and these signals are indicative that three serial pulses were transmitted by source 140.

Other sequences of pulses from source 140 will result in other particular two-out-of-five combinations of the output conductors $0_0$, $0_1$, $0_2$, $0_4$, and $0_7$ having output signals induced thereon indicative of a particular number of sequentially applied pulses.

What have been described are considered to be only illustrative embodiments of the present invention. Accordingly, it is to be understood that other and numerous arrangements may be devised by one skilled in the art without departing from the spirit and scope of this invention.

What is claimed is:

1. An electrical propagation circuit comprising a sequence of magnetic core structures each having substantially rectangular hysteresis characteristics and having a first, second and third aperture therein, a plurality of transfer circuits, each connecting one of said structures through its third aperture to a succeeding structure through its first and second apertures, a single priming circuit serially linking identically each adjacent structure of said sequence through its third aperture, and a single advance circuit serially linking identically each adjacent structure of said sequence through its third aperture.

2. An electrical propagation circuit according to claim 1 further comprising means for establishing a first magnetic condition in the first core of said sequence and a second magnetic condition in the remaining cores of said sequence, means for applying a prime current signal to said priming circuit to establish a third magnetic condition in said first core, means for applying an advance current signal to said advance circuit to establish said first magnetic condition in the second core of said sequence and to re-establish said first magnetic condition in said first core.

3. An electrical propagation circuit according to claim 1 further comprising an output conductor associated with each of said sequence of core structures, each of said conductors threading the third aperture of its associated core structure in one sense and the third aperture of the immediately succeeding core structure in the opposite sense.

4. An electrical circuit according to claim 1 further comprising means for alternately applying current signals to said priming and advance circuits.

5. An electrical propagation circuit comprising a sequence of magnetic core structures each having substantially rectangular hysteresis characteristics and having a first, second, third and fourth flux leg therein and means for completing magnetic flux paths between said legs, a plurality of transfer circuits, each coupled to the flux path including the third and fourth legs of one of said structures and to the flux path including the second and third legs of a succeeding one of said structures, a single priming circuit coupled in one sense to the flux path including the third and fourth leg of each of said structures, and a single advance circuit coupled in the opposite sense to the flux path including the third and fourth leg of each of said structures.

6. An electrical circuit according to claim 5 in which each of said transfer circuits is coupled to the fourth leg of one of said structures by $2n$ windings and to the second leg of a succeeding structure by $n$ windings.

7. An electrical circuit according to claim 5 in which each of said transfer circuits is coupled to the fourth leg of one of said structures by $2n$ windings and to each of the first and second legs of a succeeding structure by $n$ windings.

8. An electrical circuit according to claim 7 further comprising an output conductor associated with each of said sequence of core structures, each of said conductors being coupled in one sense to the flux path including the third and fourth legs of its associated core structure and being coupled in the opposite sense to the flux path including the third and fourth legs of the succeeding core structure.

9. An electrical circuit according to claim 6 further comprising an output conductor inductively coupled to the flux path including the third and fourth legs of each of said core structures and means for detecting the magnitude of signals induced in said conductor.

10. An electrical circuit according to claim 9 in which said output conductor is coupled to particular ones of said core structures by windings having different numbers of turns.

11. A parallel-to-serial translation circuit comprising a sequence of magnetic core structures each having substantially rectangular hysteresis characteristics and having a first, second and third aperture therein, all of said core structures being in a first magnetic condition, a plurality of input conductors inductively coupled to particular ones of said core structures, means for simultaneously applying input signals representative of particular information values to said input conductors, said input signals establishing a second magnetic condition in a particular one of said core structures, all succeeding core structures remaining in said first magnetic condition, a plurality of transfer circuits, each connecting one of said structures through its third aperture to a succeeding structure through its first and second apertures, a single priming circuit serially linking identically each adjacent structure of said sequence through its third aperture, a single advance circuit serially linking identically each adjacent structure of said sequence through its third aperture, means responsive to said input signals for alternately applying current signals to said priming and advance circuits thereby sequentially to establish said second magnetic condition in succeeding ones of said cores, means to detect the establishment of said second magnetic condition in the last one of said core structures, and means for determining the number of said current signals applied to said priming and advance circuits prior to the establishment of said second magnetic condition in said last core.

12. A circuit according to claim 11 further comprising means responsive to the establishment of said second magnetic condition in the last one of said core structures for terminating the application of said current signals to said priming and advance circuits and for re-establishing said first magnetic condition in all of said core structures.

13. A circuit according to claim 12 in which said means for determining the number of said current signals comprise means for counting the total number of said current signals applied to said priming circuit.

14. An electrical propagation circuit comprising a sequence of magnetic core structures each having substantially rectangular hysteresis characteristics and having a first, second, third and fourth aperture therein, a plurality of transfer circuits, each connecting one of said structures through its third aperture to a succeeding structure through its first and second apertures, a single advance circuit serially linking identically each adjacent structure of said sequence through its third aperture, a first priming circuit serially linking identically each adjacent structure of said sequence through its third aperture, a second priming circuit linking at least one of said core structures through its fourth aperture, and an output winding linking at least said one core structure through its fourth aperture.

15. A serial-to-parallel translation circuit comprising a sequence of magnetic core structures each having substantially rectangular hysteresis characteristics and having a first, second, third and fourth aperture therein, a plurality of transfer circuits, each connecting one of said structures through its third aperture to a succeeding structure through its first and second apertures, a first priming circuit serially linking identically each adjacent structure of said sequence through its third aperture, a single advance circuit serially linking identically each adjacent structure of said sequence through its third aperture, means for establishing a first magnetic condition in the first one of said sequence of core structures and a second magnetic condition in the remaining ones of said cores, means for alternately applying a particular number of input signals sequentially to said advance circuit and said first priming circuit thereby to establish said first magnetic condition in a particular number of succeeding ones of said core structures, a second priming circuit serially linking identically each adjacent structure of said sequence through its fourth aperture, a plurality of output windings, each linking particular ones of said structures through their fourth apertures, a reset winding inductively coupled to all of said structures, means for applying a priming signal to said second priming circuit, means for applying an interrogating signal to said reset winding and means for simultaneously detecting output signals induced in particular ones of said output windings.

16. A circuit according to claim 15 in which said means for alternately applying input signals to said advance and priming circuits comprises a relay having make and break contacts, one contact being connected to said advance circuit, the other contact being connected to said priming circuit, and means for sequentially energizing and de-energizing said relay.

References Cited by the Examiner

UNITED STATES PATENTS

| | | | |
|---|---|---|---|
| 2,911,628 | 11/1959 | Briggs | 340—174 |
| 2,963,687 | 12/1960 | Briggs | 340—174 |
| 2,968,795 | 1/1961 | Briggs | 340—174 |
| 3,125,747 | 3/1964 | Bennion | 340—174 |

BERNARD KONICK, *Primary Examiner.*

IRVING SRAGOW, *Examiner.*

R. J. McCLOSKEY, M. S. GITTES, *Assistant Examiners.*